United States Patent [19]
Kohler et al.

[11] Patent Number: 6,003,331
[45] Date of Patent: Dec. 21, 1999

[54] RECOVERY OF FLUE GAS ENERGY IN A TRIPLE-EFFECT ABSORPTION REFRIGERATION SYSTEM

[75] Inventors: Jay A. Kohler, York, Pa.; Xiaoyu He, Jiangsu, China

[73] Assignee: York International Corporation, York, Pa.

[21] Appl. No.: 09/034,167

[22] Filed: Mar. 2, 1998

[51] Int. Cl.[6] .................................................. F25B 15/00
[52] U.S. Cl. .............................. 62/476; 62/489; 62/497
[58] Field of Search .............................. 62/476, 489, 497

[56] References Cited

U.S. PATENT DOCUMENTS

| | | |
|---|---|---|
| 2,453,823 | 11/1948 | Williams . |
| 3,266,266 | 8/1966 | Reid, Jr. . |
| 3,316,728 | 5/1967 | Biermann . |
| 3,452,550 | 7/1969 | Dyre et al. . |
| 3,541,013 | 11/1970 | Macriss et al. . |
| 3,593,540 | 7/1971 | Hopkins . |
| 3,742,728 | 7/1973 | Mamiya . |
| 3,783,631 | 1/1974 | Modahl et al. . |
| 3,817,050 | 6/1974 | Alexander et al. . |
| 3,831,397 | 8/1974 | Mamiya . |
| 3,928,983 | 12/1975 | Ainbinder et al. . |
| 3,949,566 | 4/1976 | Hopkins . |
| 3,977,204 | 8/1976 | Bourne . |
| 4,315,411 | 2/1982 | Vardi et al. . |
| 4,333,515 | 6/1982 | Wilkinson et al. . |
| 4,439,999 | 4/1984 | Mori et al. . |
| 4,475,361 | 10/1984 | Alefeld . |
| 4,520,634 | 6/1985 | Oouchi et al. . |
| 4,531,374 | 7/1985 | Alefeld . |
| 4,542,628 | 9/1985 | Sarkisian et al. . |
| 4,542,629 | 9/1985 | Biermann . |
| 4,546,620 | 10/1985 | Biermann . |
| 4,548,048 | 10/1985 | Reimann et al. . |
| 4,551,991 | 11/1985 | Miyoshi et al. . |
| 4,637,218 | 1/1987 | Tchernev . |
| 4,732,008 | 3/1988 | DeVault . |

(List continued on next page.)

FOREIGN PATENT DOCUMENTS

| | | |
|---|---|---|
| 278076 | 9/1914 | Germany . |
| 1068671A | 2/1982 | U.S.S.R. . |
| 1208467 | 10/1970 | United Kingdom . |
| WO 90/12848 | 11/1990 | WIPO . |
| WO 93/11393 | 6/1993 | WIPO . |
| WO 95/09334 | 4/1995 | WIPO . |

*Primary Examiner*—William Doerrler
*Assistant Examiner*—Mark Shulman
*Attorney, Agent, or Firm*—Finnegan, Henderson, Farabow, Garrett & Dunner, L.L.P.

[57] ABSTRACT

A triple-effect absorption refrigeration system is provided with an evaporator and an absorber operatively connected to receive a refrigerant vapor discharged from the evaporator. First, second, and third generators are operatively connected to receive an input absorption solution discharged from the absorber and to discharge an output absorption solution for return to the absorber. These first, second and third generators each discharge a refrigerant vapor. A heat source for heating the input absorption solution in the third generator to a first temperature is provided. The heat source separates the input absorption solution in the third generator into the refrigerant vapor and the output absorption solution. The heat source further generates energy laden combustion products. First, second, and third condensers are operatively connected to receive the refrigerant vapor discharged from the first, second and third generators, respectively, and to condense the refrigerant vapor into a refrigerant liquid. The second and third condensers are operatively connected to transfer the refrigerant liquid to the first and second condensers, respectively, while the first condenser is operatively connected to transfer refrigerant liquid to the evaporator. The second and third condensers are also operatively connected to exchange heat with the first and second generators, respectively, thereby separating the input absorption solution in the first and second generators, respectively, into the refrigerant vapor and the output absorption solution. A combustion products-to-solution heat exchanger is operatively connected to transfer heat from the combustion products to the input absorption solution.

27 Claims, 9 Drawing Sheets

U.S. PATENT DOCUMENTS

| | | |
|---|---|---|
| 4,827,728 | 5/1989 | DeVault et al. . |
| 4,921,515 | 5/1990 | Dao . |
| 4,926,659 | 5/1990 | Christensen et al. . |
| 5,033,274 | 7/1991 | Erickson . |
| 5,186,009 | 2/1993 | Rockenfeller . |
| 5,205,136 | 4/1993 | DeVault et al. . |
| 5,284,029 | 2/1994 | Keuper et al. . |
| 5,335,515 | 8/1994 | Rockenfeller et al. . |
| 5,390,509 | 2/1995 | Rockenfeller et al. . |
| 5,467,614 | 11/1995 | DeVault . |
| 5,584,193 | 12/1996 | Biermann . |
| 5,727,397 | 3/1998 | He . |

RECOVERY OF FLUE GAS ENERGY IN A TRIPLE-EFFECT ABSORPTION REFRIGERATION SYSTEM

BACKGROUND OF THE INVENTION

1. Field of the Invention

The present invention relates to a triple effect absorption refrigeration system. Particularly, the present invention relates to a triple-effect absorption refrigeration system using a direct-fired heat source to heat its high temperature generator. More particularly, the present invention relates to the recovery of energy from the combustion products generated by the direct-fired heat source and the utilization of this energy within the absorption cycle of a triple-effect absorption refrigeration system.

2. Description of the Related Art

Absorption refrigeration systems are generally used to cool commercial buildings. A single-effect absorption system typically comprises a generator, a condenser, an evaporator and an absorber. In this system, a refrigerant-containing absorption solution is heated in the generator by an outside heat source, such as a fuel burner, low-pressure steam, or hot water, in order to boil off refrigerant vapor. The refrigerant vapor is condensed to refrigerant liquid, and then routed to an evaporator. The refrigerant liquid in the evaporator absorbs the heat from the air in the commercial building being cooled, again flashing to vapor. The refrigerant vapor flows to an absorber, where it mixes with an absorption liquid, and the combined refrigerant-containing absorption solution is pumped to the generator.

The single-effect absorption system described above is extremely inefficient, having a thermal Coefficient of Performance (COP) of approximately 0.7.

A more modem approach is to use a double-effect absorption refrigeration system. In this latter system, the single generator and condenser are replaced by two generators (a high temperature generator and a low temperature generator) and two condensers (also high temperature and low temperature). Primary heat is supplied to the high temperature generator to boil off refrigerant vapor from the refrigerant-containing absorption solution. The refrigerant vapor is condensed in the high temperature condenser. The heat of condensation from the high temperature condenser is used to heat the refrigerant-containing absorption solution in the low temperature generator, boiling off more vapor in that generator. In this manner, the heat input to the system is utilized twice to generate refrigerant vapor. The thermal COP of a double-effect absorption system hence is improved to approximately 1.2.

In recent years, experiments have been conducted with triple-effect absorption systems, utilizing three generators and three condensers with a single absorber and a single evaporator. Triple-effect absorption systems use the primary heat input to the high temperature generator three times to generate refrigerant vapor. Various configurations of known related triple-effect absorption systems are discussed below.

FIG. 1 depicts one known triple-effect absorption system, in which an absorber A provides refrigerant-containing absorption solution to three generators, including a high temperature generator G3, an intermediate temperature generator G2, and a low temperature generator G1. In this system, the absorption solution is supplied to the three generators from absorber A via a parallel flowpath connection. Each generator feeds refrigerant vapor to a corresponding condenser, including a high temperature condenser C3, an intermediate temperature condenser C2, and a low temperature condenser C1. Furthermore, the higher temperature condensers C3 and C2 are coupled with the lower temperature generators G2 and G1, respectively. Hence, the system is referred to as a double-coupled condenser (DCC) triple-effect absorption system. Heat exchangers HX1, HX2, and HX3 can be provided in the parallel flowpath from the absorber. The thermal COP for this parallel solution flowpath system is calculated to be 1.730.

FIG. 2 depicts another known DCC triple-effect absorption system. In this configuration, generators G1, G2 and G3 are connected in an inverse series flowpath connection with absorber A, rather than in a parallel flowpath connection as in FIG. 1. Heat exchangers HX1, HX2 and HX3 are provided in the inverse series flowpath.

FIG. 3 depicts yet another known DCC triple-effect absorption system, with the generators G3, G2 and G1 connected to the absorber A in a series flow arrangement. Heat exchangers HX1, HX2 and HX3 are provided in the series flowpath. The thermal COP for this series solution flowpath system is calculated to be 1.608.

FIG. 4 depicts still another known DCC triple-effect absorption system, having an inverse parallel series solution feeding arrangement, which system is fully described in U.S. patent application Ser. No. 08/743,373, filed Nov. 4, 1996, and entitled Triple Effect Absorption Refrigeration System, the disclosure of which is incorporated herein by reference. Generators G1 and G2 are connected to absorber A in a parallel flow arrangement and generator G3 is connected to generator G2 in a series flow arrangement. A weak solution, which means a solution containing a low ratio of absorption fluid to refrigerant, is fed from the absorber into the low temperature generator G1 and the intermediate temperature generator G2 in parallel. The solution in G2 is heated, and refrigerant vapor is boiled off. The now more concentrated solution, containing a higher ratio of absorption fluid to refrigerant, is sent from G2 to high temperature generator G3. The solution is further concentrated as more refrigerant is boiled off, and then exits G3. Likewise, the weak solution in G1 is concentrated as refrigerant is boiled off, and the more concentrated solution exits G1. This solution exiting G1 mixes with the more concentrated absorption liquid exiting G3, and returns to the absorber. The system primary energy is input to G3, where it heats the solution and generates refrigerant vapor as described above. The refrigerant vapor generated from G3 is condensed in high temperature condenser C3, and the heat of condensation is exchanged with G2 in order to generate refrigerant vapor in G2, as described above. The condensate from C3 and the vapor from G2 pass intermediate temperature condenser C2. The heat of condensation in C2 is exchanged with G1 in order to generate refrigerant vapor from G1 as described above. The condensate from C2 and the vapor from G1 collect in low temperature condenser C1, and the resulting condensate is sent to evaporator E in order to obtain the desired refrigeration effect. The resultant low pressure vapor is then passed from the evaporator to the absorber, where it combines with the returning concentrated solution to dilute the solution and begin a new cycle. Computer simulations show that the inverse parallel series solution feeding arrangement provides the highest thermal COP (1.736) of all the aforementioned DCC triple-effect absorption systems.

All of the various DCC triple-effect absorption systems use a primary energy source to supply heat to the high temperature generator for boiling off refrigerant vapor from the refrigerant-containing absorption solution. One such energy source is a direct-fired apparatus, which generates products of combustion or flue gases. After transferring heat to the solution, the combustion gases are discharged from the generator via a chimney or flue. Because the combustion gases are discharged at an elevated temperature, there is energy lost in the discharge of these gases.

The use of heat recovery systems to recoup the energy from flue gases in single effect and double effect absorption refrigeration systems is limited by practical considerations. First, there exists a tradeoff between the value of the energy that can be recovered from the flue gases and the cost of the additional heat exchanger surface necessary to recover that energy. Second, excessively low flue gas temperatures can result in condensation of corrosive gases, particularly if sulfur is present in the fuel. This can lead to undesirable corrosion in the generator or flue. Thus, for any given flue gas temperature, the energy that can be recovered is limited by the condensation temperature of these corrosive gases. Improvement in combustion efficiency through recuperation of the energy in flue gases is restricted by these factors, and as a result, is generally impracticable for single and double effect systems.

However, in order to achieve high performance levels, triple effect absorption cycles operate at higher temperatures than double effect or single effect cycles. Typically, triple effect cycles are calculated to operate with solution temperatures in the high temperature generator that are 100° F. to 150° F. higher than in a double effect cycle. For example, typical double effect refrigeration systems, using a lithium bromidewater solution, operate with solution temperatures leaving the high temperature generator of 300° F. to 330° F., while analysis of similar triple effect refrigeration systems shows they would operate with solution temperatures leaving the high temperature generator of 400° F. to 480° F.

The focus in the design of triple effect absorption refrigeration systems has been to try to limit the maximum solution temperatures in the high temperature generators. High solution temperatures create corrosion problems within the solution's flowpath. Furthermore, reducing the solution temperatures in the high temperature generators would result in a reduction in the temperature of the exhaust gas exiting from the generator. Lower exiting exhaust gas temperatures mean an increase in combustion efficiency.

Thus, prior experience with single and double effect absorption refrigeration systems biases one away from recouping the energy from the direct-fired burner's combustion products. And the trend in the triple effect absorption refrigeration system industry has been to reduce both the solution temperatures in the high temperature generators and the corresponding temperatures of the exhaust gas exiting from the high temperature generator.

SUMMARY OF THE INVENTION

The present invention has been made in view of the above circumstances and is intended to provide a more efficient triple-effect absorption refrigeration system through the recovery of energy from combustion products generated by the primary heat source.

Unlike the single and double effect systems, opportunity exists in the triple-effect system for recovering the energy from the exiting flue gases as a result of their relatively higher temperatures, while avoiding condensation of corrosive gases. Rather than struggling to reduce the exiting exhaust gas temperatures to improve combustion efficiency, the high temperatures of the exiting exhaust gas can be recovered and used to advantage.

Advantages of the invention will be set forth in part in the description which follows, and in part will be obvious from the description, or may be learned by practice of the invention. The advantages of the invention may be realized and attained through the combinations particularly pointed out in the appended claims.

In accordance with the purposes of the invention, as broadly described herein, a triple-effect absorption refrigeration system having a combustion product energy recuperation system is provided. The system includes an evaporator. An absorber is operatively connected to receive a refrigerant vapor discharged from the evaporator. First, second and third generators are operatively connected to receive an input solution discharged from the absorber and to discharge an output absorption solution for return to the absorber. In addition, the generators each discharge a refrigerant vapor. A heat source is provided for heating the solution in the third generator to a first temperature, thereby separating the input solution in the third generator into the refrigerant vapor and the output solution. The heat source generates energy laden combustion products. The generators discharge refrigerant vapor which the condensers receive and condense into refrigerant liquid—first, second and third condensers are operatively connected to receive and condense the refrigerant vapor discharged from the first, second and third generators, respectively. The condensers discharge the refrigerant liquid—the second and third condensers are operatively connected to transfer the refrigerant liquid to the first and second condensers, respectively, and the first condenser is operatively connected to transfer refrigerant liquid to the evaporator. The condensers also discharge heat which may be used within the cycle—the second and third condensers are operatively connected to exchange heat with the first and second generators, respectively, thereby separating the input solution into the refrigerant vapor and the output solution. Finally, a combustion products-to-solution heat exchanger is also provided, operatively connected to transfer heat from the combustion products to the input solution.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate the related art and several embodiments of the invention. Together with the description, the drawings help to explain the advantages and principles of the invention. In the drawings.

DETAILED DESCRIPTION OF THE PREFERRED EMBODIMENTS

Reference will now be made in detail to the present preferred embodiments of the invention as broadly illustrated in the accompanying drawings. Wherever possible, the same reference labels will be used throughout the drawings to refer to the same or like parts.

Figure 1:
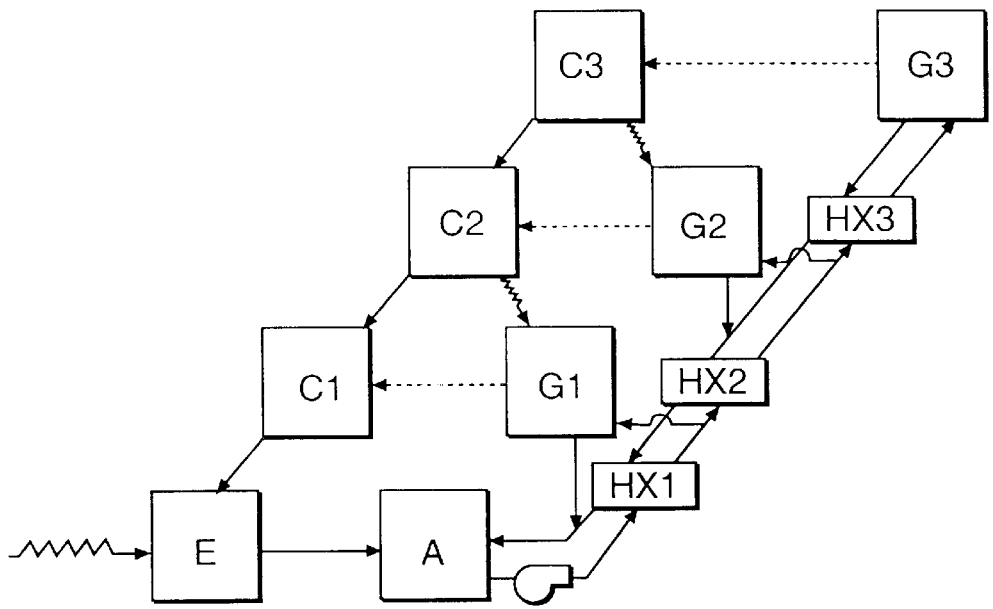
FIG. 1 depicts a parallel triple-effect absorption refrigeration system.
Figure 2:
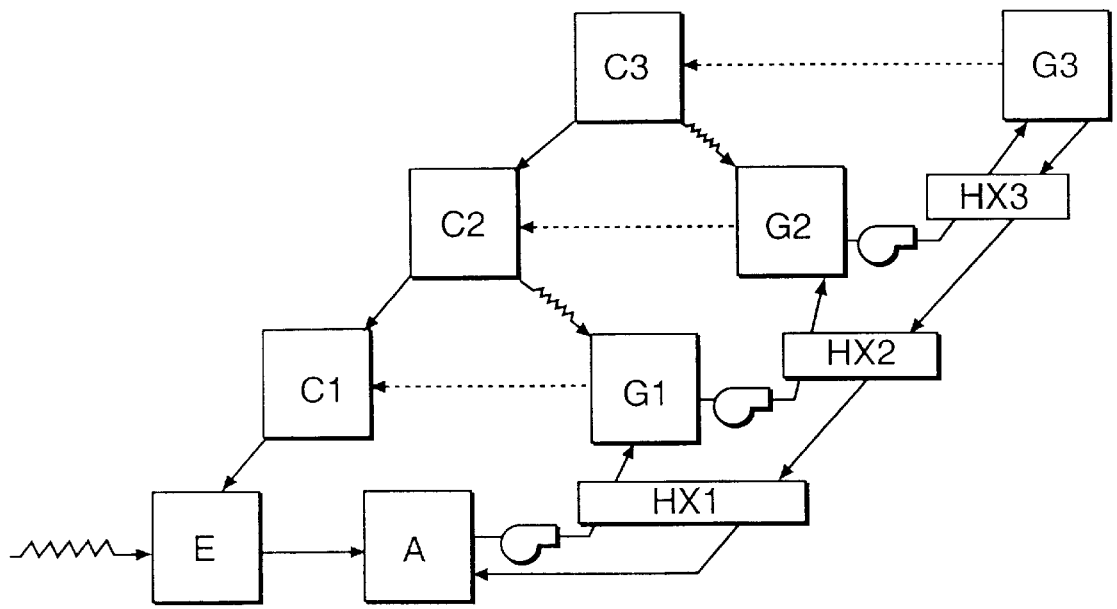
FIG. 2 depicts an inverse series triple-effect absorption refrigeration system.
Figure 3:
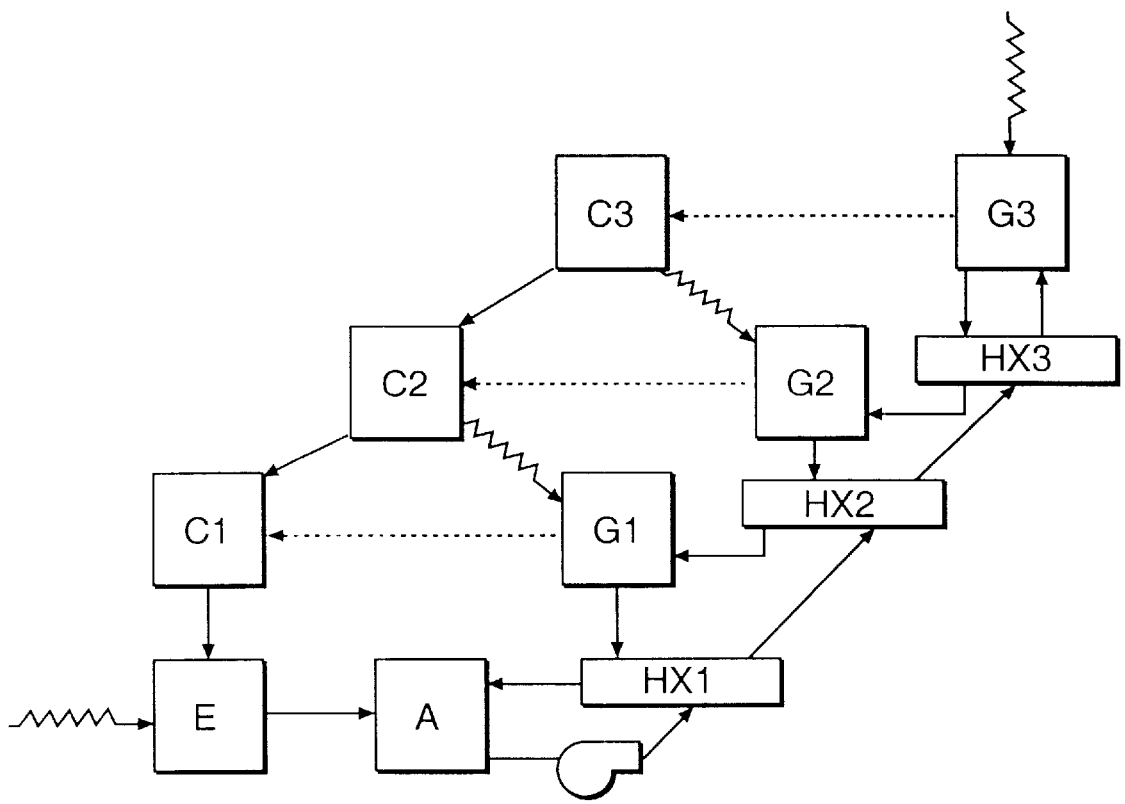
FIG. 3 depicts a series triple-effect absorption refrigeration system.
Figure 4:
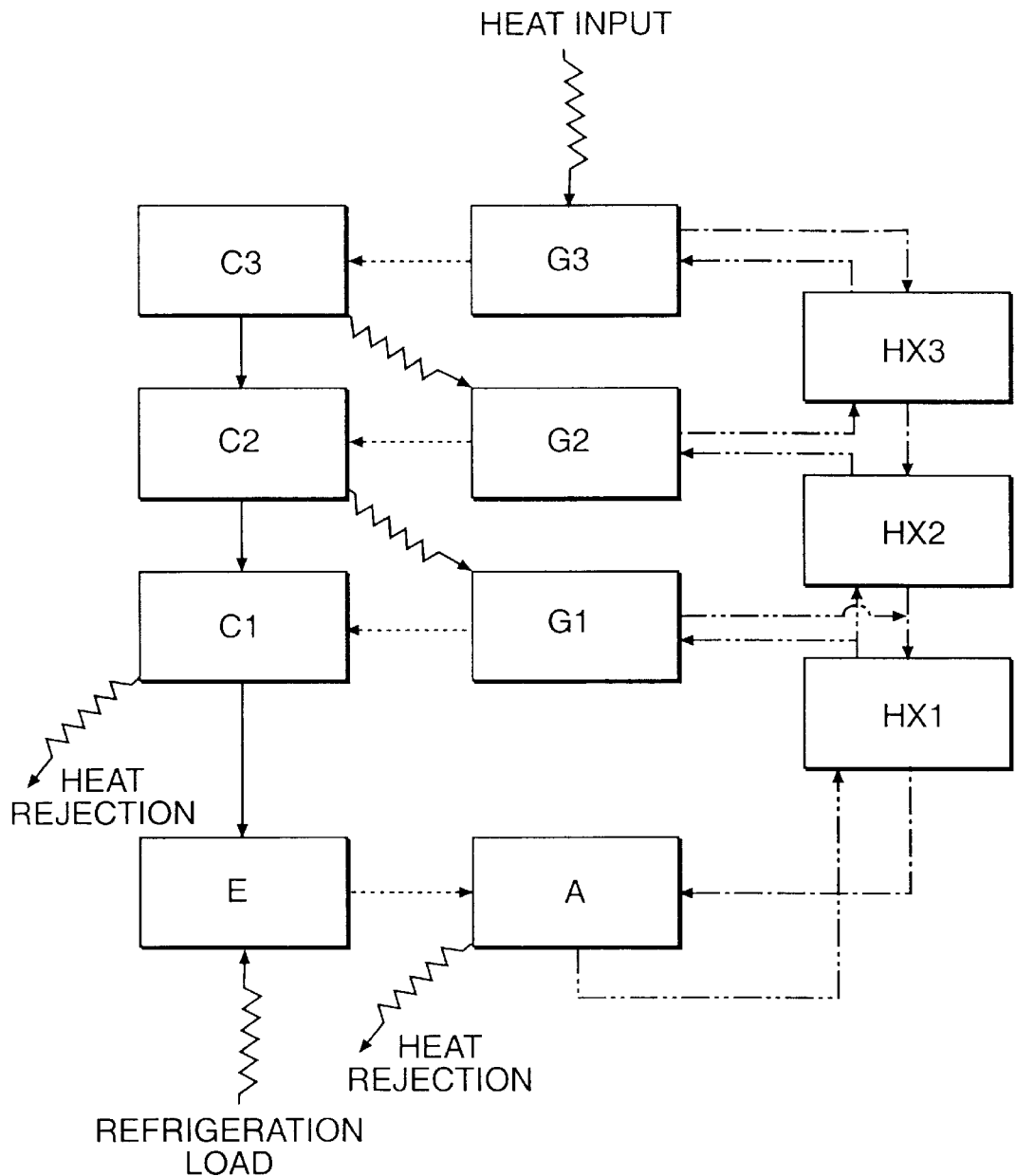
FIG. 4 depicts an inverse parallel series triple-effect absorption refrigeration system.
Figure 5:
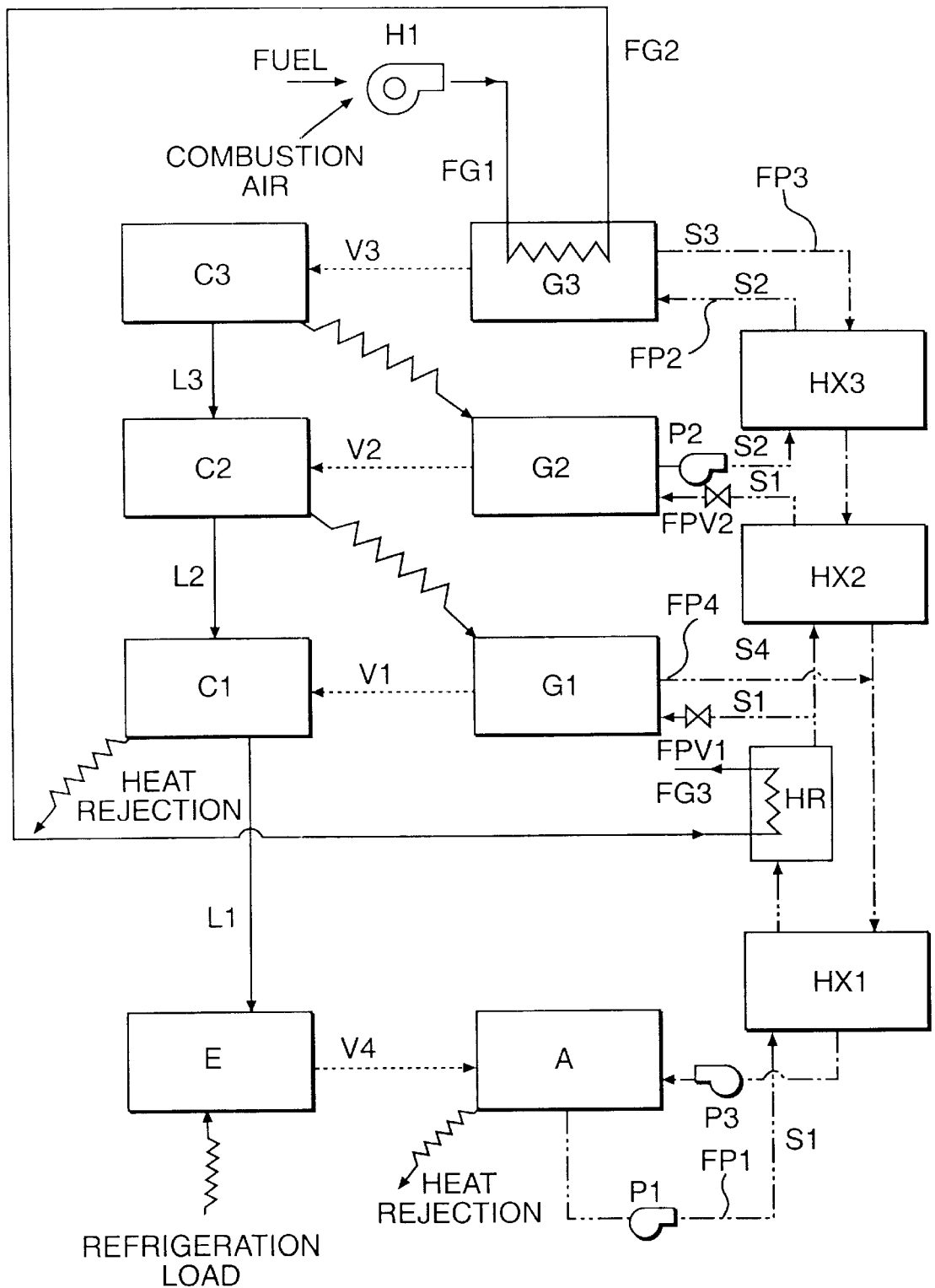
FIG. 5 is a schematic illustrating a first embodiment of a triple-effect absorption refrigeration system with a flue gas recuperation system in accordance with the present invention.

An exemplary embodiment of the present invention is a triple-effect absorption refrigeration system with a flue gas recuperation system as illustrated in FIG. 5.

In accordance with the invention and as generally embodied in FIG. 5, the triple-effect absorption refrigeration system includes an evaporator E. The evaporator E is the component which receives the refrigeration load, and thereby cools the building or enclosure being refrigerated. Evaporator E may be any of the evaporators that are well known in the art.

In accordance with the invention and as generally embodied in FIG. 5, an absorber A is operatively coupled, via a conduit, to the evaporator E to receive a low pressure refrigerant vapor V4 discharged from the evaporator E. Absorber A is a single absorber. The structure of absorber A is well known in the art.

In accordance with the invention, first, second and third generators are operatively connected to the absorber to receive an input absorption solution discharged from the absorber. The triple-effect absorption refrigeration system embodied in FIG. 5, feeds solution from a single absorber to first and second generators in parallel. Solution from the second generator is then fed in series to a third generator. This configuration is referred to as an Inverse-Parallel Series. As generally shown in FIG. 5, a first low temperature generator G1, a second intermediate temperature generator G2, and a third high temperature generator G3 are provided. Generators G1 and G2 are connected in parallel with absorber A. Generator G3 is connected in series with generator G2.

As shown in FIG. 5, a first weak solution S1 containing both absorption fluid and refrigerant, preferably a weak lithium bromide-water (LiBr) solution, is transferred from absorber A in a first piping flowpath to generators G1 and G2. Preferably, a first solution pump P1 is provided to pump solution S1 to generators G1 and G2, via flowpath valves FPV1 and FPV2, respectively, in first flowpath FP1. As noted above, generators G1 and G2 are connected in parallel. In other words, the first flowpath FP1 is a parallel flowpath. Consequently, roughly 50% of the volume of solution S1 is transferred to each respective generator.

As further shown in FIG. 5, a second weak solution S2 is transferred from generator G2 in a second flowpath FP2 to generator G3. Preferably, a second solution pump P2 is provided to pump solution S2 from generator G2 to generator G3. Solution S2 is the same weak LiBr solution that entered generator G2, but now somewhat more concentrated than when it entered generator G2 as solution S1 for reasons to be described below. As noted above, generator G3 is connected in series with generator G2. In other words, second flowpath FP2 is a series flowpath. Because generator G3 is connected in series with generator G2, all of second solution S2 is transferred from generator G2 to generator G3.

In accordance with the invention, the first, second and third generators are operatively connected to discharge an output absorption solution for return to the absorber. As generally embodied in FIG. 5, a third piping flowpath FP3 directs absorption solution S3 from generators G2 and G3 back to absorber A, and a fourth piping flowpath FP4 directs absorption solution S4 from generator G1 back to absorber A. A third solution pump P3 is provided in third piping flowpath FP3 to assist in returning solutions S3 and S4 to absorber A. Pump P3 preferably is provided downstream of the heat exchangers, which will be described below.

Further in accordance with the invention, the first, second and third generators each discharge a refrigerant vapor. As embodied in FIG. 5, generator G1 discharges refrigerant vapor V1; generator G2 discharges refrigerant vapor V2; and generator G3 discharges refrigerant vapor V3.

In accordance with the invention, a primary heat source is provided for heating the solution in the third generator to a first temperature, thereby separating the solution in the third generator into a refrigerant vapor and an output solution. As embodied in FIG. 5, a primary heat source H1 is provided for heating solution S2 within high temperature generator G3. Primary heat source H1 is a direct-fired apparatus, such as a gas burner or other type of furnace. The various possible structures of heat source H1 are well known in the art.

Application of the heat input to solution S2 in generator G3 raises solution S2 to a first temperature, which is at or above the vaporization temperature of the refrigerant in solution S2. At this temperature, refrigerant in solution S2 is evaporated and driven off in the form of refrigerant vapor V3. This step leaves behind a third solution S3, which is a concentrated absorption solution generally at the first temperature.

In accordance with the invention, the heat source generates energy laden combustion products. As generally embodied in FIG. 5, heat source H1 generates combustion products or flue gases FG1 at a temperature greater than the temperature of solution S2 in generator G3. Flue gases FG1 are shown entering generator G3. After transferring a portion of their energy as heat to solution S2 in generator G3 the combustion products exit generator G3 as flue gases FG2. As described below, a combustion products-to-solution heat exchanger HR transfers some of the remaining energy stored in flue gases FG2 to the input solution.

In addition to combustion products-to-solution heat exchanger HR, one or more solution-to-solution heat exchangers may be provided in the solution flowpaths. A solution-to-solution heat exchanger preheats the input solution prior to entering the respective generators with heat from the output solution which is returning to the absorber. This preheating increases the thermal Coefficient of Performance (COP) of the system.

As embodied in FIG. 5, a first solution-to-solution heat exchanger HX1 is operatively connected to preheat solution S1 flowing from absorber A to first and second generators G1 and G2 in first flowpath FP1 with solution S3 discharged from third generator G3 and solution S4 discharged from first generator G1. First solution-to-solution heat exchanger HX1 is provided in parallel flowpath FP1, receiving weak solution S1 from absorber A, and preheats solution S1 with hot concentrated solution S3 from third generator G3, combined with a less concentrated solution S4 returning from first generator G1. A portion of preheated solution S1 (approximately 50% thereof) flows to first generator G1.

Another portion of preheated solution S1 continues in parallel flowpath FP1 to a second solution-to-solution heat exchanger HX2. In HX2, the second portion of preheated solution S1 is further preheated by hot concentrated solution S3 from third generator G3. This preheated portion of solution S1 now enters second generator G2.

Solution S2, departing from second generator G2 in series flowpath FP2, passes through a third solution-to-solution heat exchanger HX3, where it is preheated by hot concentrated solution S3 from third generator G3. Preheated solution S2 then enters generator G3. The structures of the solution-to-solution heat exchangers are well known to persons of ordinary skill in the art.

In accordance with the invention, first, second, and third condensers are operatively connected to receive and condense refrigerant vapor discharged from the first, second and third generators, respectively, into a refrigerant liquid. As depicted in FIG. 5, refrigerant vapor V3, having been boiled off in third generator G3, flows into third condenser C3. Similarly, refrigerant vapor V2, having been boiled off in second generator G2, flows into second condenser C2, and refrigerant vapor V1, having been boiled off in first generator G1, flows into first condenser C1. Condensers C3, C2 and C1 condense refrigerant vapors V3, V2 and V1 into refrigerant liquids L3, L2 and L1, respectively, and in so doing, release heat.

Further in accordance with the invention, the second and third condensers are operatively connected to transfer the refrigerant liquid to the first and second condensers, and the first condenser is operatively connected to transfer refrigerant liquid to the evaporator. As generally embodied in FIG. 5, condenser C3 is operatively connected to transfer refrigerant liquid L3 to condenser C2. Similarly, condenser C2 is operatively connected to transfer the combined refrigerant liquids L2 and L3 to condenser C1. Condenser C1 is operatively connected to transfer the combined refrigerant liquids L1, L2 and L3 to evaporator E.

Also in accordance with the invention, the second and third condensers are operatively connected to exchange heat with the first and second generators, respectively. As generally embodied in FIG. 5, second condenser C2 is operatively connected to exchange heat with first generator G1 for separating solution S1 into refrigerant vapor V1 and output solution S4. Similarly, third condenser C3 is operatively connected to exchange heat with second generator G2 for separating solution S1 into refrigerant vapor V2 and output solution S2.

Although shown schematically as a separate component in FIG. 5, third condenser C3 may be physically located adjacent to or combined with second generator G2 so that the hot vapor V3 transfers heat to solution S1 in second generator G2. This heat transfer between third condenser C3 and second generator G2 condenses vapor V3 in condenser C3, while at the same time raising the solution S1 in second generator G2 to a second temperature. This second temperature is lower than the first temperature in first generator G1, but still causes some of the refrigerant in solution S1 in to flash into refrigerant vapor V2.

As shown in FIG. 5, the refrigerant liquid condensate from third condenser C3 and the refrigerant vapor V2 from second generator G2 flow to second condenser C2. Although shown schematically as a separate component in FIG. 5, second condenser C2 may be physically located adjacent to or combined with first generator G1 so that the hot vapor V2 and high temperature liquid condensate from C3 transfer heat to solution S1 in first generator G1. This heat transfer between second condenser C2 and first generator G1 condenses vapor V2 in second condenser C2, while at the same time raising the solution S1 in first generator G1 to a third temperature. This third temperature is lower than the first and second temperatures, but still causes some of the refrigerant in solution S1 in first generator G1 to flash into refrigerant vapor V1.

As shown in FIG. 5, the refrigerant condensate from second condenser C2 and the refrigerant vapor V1 from first generator G1 flow to first condenser C1. Heat is rejected at first condenser C1, thereby condensing all of the refrigerant into liquid. The cool liquid refrigerant flows back to evaporator E in order to exchange heat with the refrigeration load, beginning the cycle over again.

In accordance with the invention, a combustion products-to-solution heat exchanger is operatively connected to transfer heat from the combustion products to the input solution. As embodied in FIG. 5, combustion products-to-solution heat exchanger HR is operatively connected to heat source H1 and to solution flowpath FP1. Heat exchanger HR transfers heat from flue gases FG2 to solution S1 flowing from absorber A to first and second generators G1 and G2 in first flowpath FP1. Flue gases FG2 are directed through heat exchanger HR wherein they are cooled and discharged from heat exchanger HR as flue gases FG3.

Recovery of the energy found in the combustion products at other locations within the absorption cycle is possible. Moreover, the location in which the energy is recovered within the cycle will influence the overall COP improvement. In general, the higher the solution temperature in the combustion products-to-solution heat exchanger, the greater the COP improvement will be. Heat which is introduced at a lower temperature within the cycle acts somewhat like a single effect cycle so that the efficiency of its recovery is not so high. Heat which is recovered at a higher temperature within the cycle acts somewhat like a double effect cycle so that the efficiency of its recovery is higher.

Offsetting the cycle effects are heat exchanger design considerations. For a given flue gas temperature, lower solution temperatures allow for a higher temperature difference between the solution and the flue gas. This is commonly referred to as the Mean Temperature Difference (MTD). For a given amount of heat transfer, the greater the MTD, the less heat exchange surface area is required. Consequently, selection of a location for the combustion products-to-solution heat exchanger requires a tradeoff between less heat exchanger surface area, i.e., lower costs, and higher COP.

Figure 6:
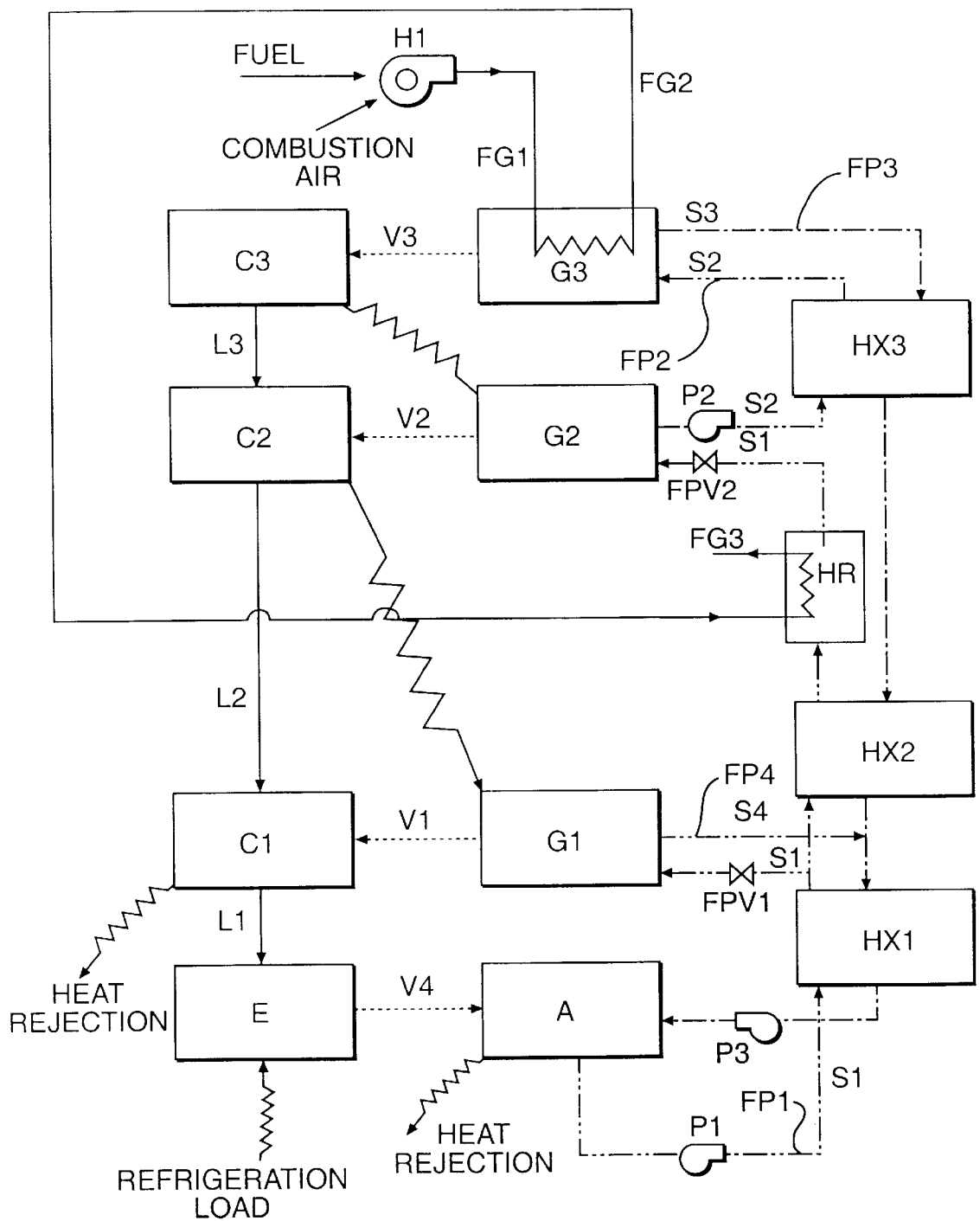
FIG. 6 is a schematic illustrating a second aspect of the invention of FIG. 5.

With this tradeoff in mind, an alternative aspect of the first embodiment of the present invention is depicted in FIG. 6. The combustion products-to-solution heat exchanger HR may be located in solution flowpath FP1 downstream of where the solution flowpath branches off to generator G1. In this alternative aspect of the first embodiment, heat exchanger HR transfers heat from flue gases FG2 to solution S1 flowing from absorber A to second generator G2. Flue gases FG2 enter heat exchanger HR, transfer heat to solution S1 and exit heat exchanger HR as cooler flue gases FG3. Solution S1 is thereby preheated prior to entering generator G2.

Figure 7:
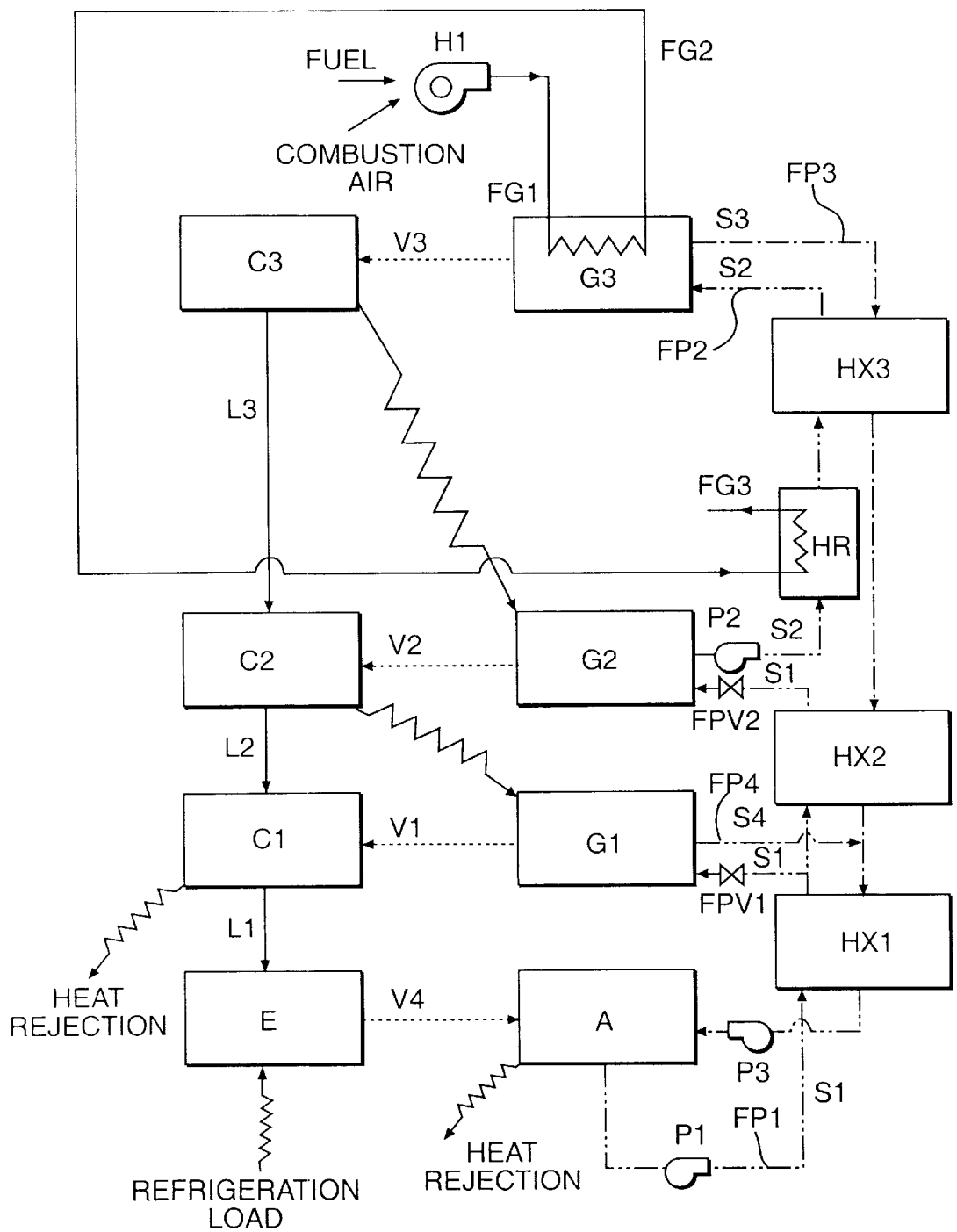
FIG. 7 is a schematic illustrating a third aspect of the invention of FIG. 5.

A further alternative aspect of the first embodiment of the present invention is depicted in FIG. 7. The combustion products-to-solution heat exchanger HR may be located in solution flowpath FP2. In this alternative aspect of the first embodiment, heat exchanger HR transfers heat from flue gases FG2 to solution S2 flowing from first generator G1 to second generator G2. Flue gases FG2 enter heat exchanger HR, transfer heat to solution S2 and exit heat exchanger HR as cooler flue gases FG3. Solution S2 is thereby preheated prior to entering generator G3.

Figure 8:
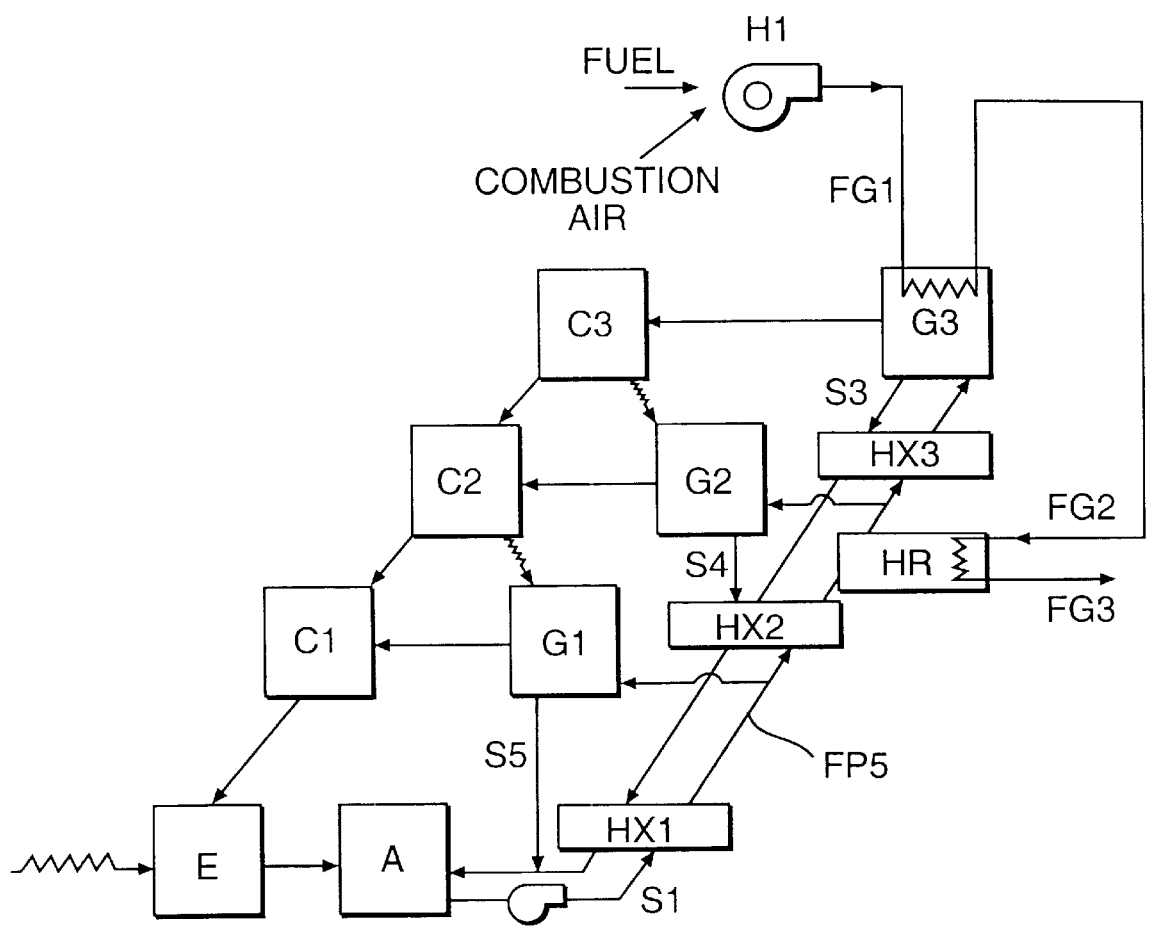
FIG. 8. is a schematic illustrating a second embodiment of a triple-effect absorption refrigeration system with a flue gas recuperation system in accordance with the present invention.

A second embodiment of the present invention is shown in FIG. 8. In this embodiment, absorber A provides refrigerant-containing absorption solution to the first, second and third generators G1, G2 and G3 via a parallel flowpath FP5. Input solution S1 is pumped from absorber A to generators G1, G2 and G3 in parallel. Output solution S3 flows from generator G3 to absorber A; output solution S4 flows from generator G2 to absorber A; and output solution S5 flows from generator G1 to absorber A.

As embodied in FIG. 8, solution-to-solution heat exchangers HX1, HX2 and HX3 are operatively connected to transfer heat from output solution S3 to input solution S1. Relative to flowpath FP5, heat exchanger HX1 is located upstream of the branch off for solution S1 going to generator G1. Heat exchanger HX2 is located downstream of the branch off for solution S1 going to generator G1 and upstream of the branch off for solution S1 going to generator G2. Heat exchanger HX3 is located downstream of the branch off for solution S1 going to generator G2 and upstream of generator G3.

As further illustrated in FIG. 8, combustion product-to-solution heat exchanger HR is operatively connected to transfer heat from flue gases FG2 to solution S1. Although heat exchanger HR is depicted as being located downstream of heat exchanger HX3 in flowpath FP5, it may be located anywhere along flowpath FP5.

Figure 9:
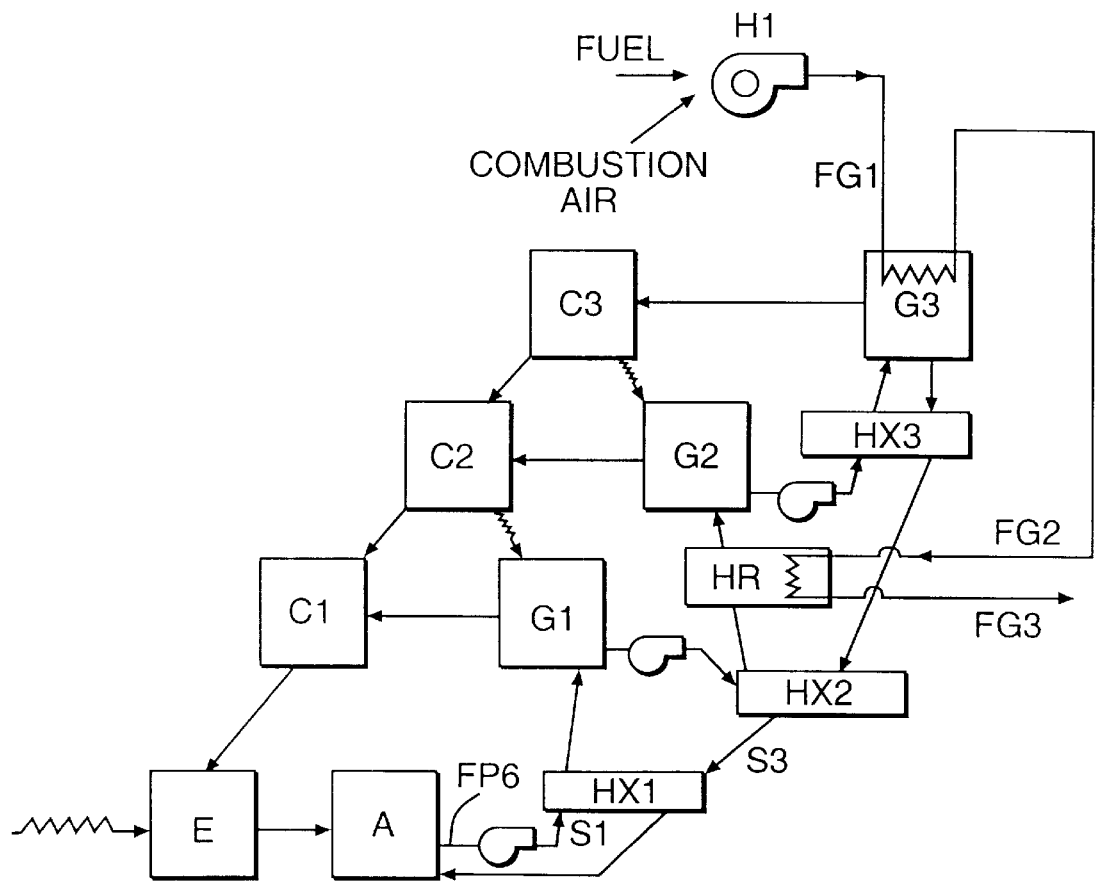
FIG. 9. is a schematic illustrating a third embodiment of a triple-effect absorption refrigeration system with a flue gas recuperation system in accordance with the present invention.

A third embodiment of the present invention is shown in FIG. 9. In this embodiment, absorber A provides refrigerant-containing absorption solution to the first, second and third generators G1, G2 and G3 via an inverse series flowpath FP6. Input solution S1 is pumped from absorber A to generator G1, from generator G1 to generator G2 and from generator G2 to generator G3, arranged in inverse series. Output solution S3 flows from generator G3 to absorber A.

As embodied in FIG. 9, solution-to-solution heat exchangers HX1, HX2 and HX3 are operatively connected to transfer heat from output solution S3 to input solution S1. Heat exchanger HX1 is located between absorber A and generator G1. Heat exchanger HX2 is located between generator G1 and generator G2. Heat exchanger HX3 is located between generator G2 and generator G3.

As further illustrated in FIG. 9, combustion product-to-solution heat exchanger HR is operatively connected to transfer heat from flue gases FG2 to solution S1. Although heat exchanger HR is depicted as being located downstream of heat exchanger HX3 in flowpath FP6, it may be located anywhere along flowpath FP6.

Figure 10:
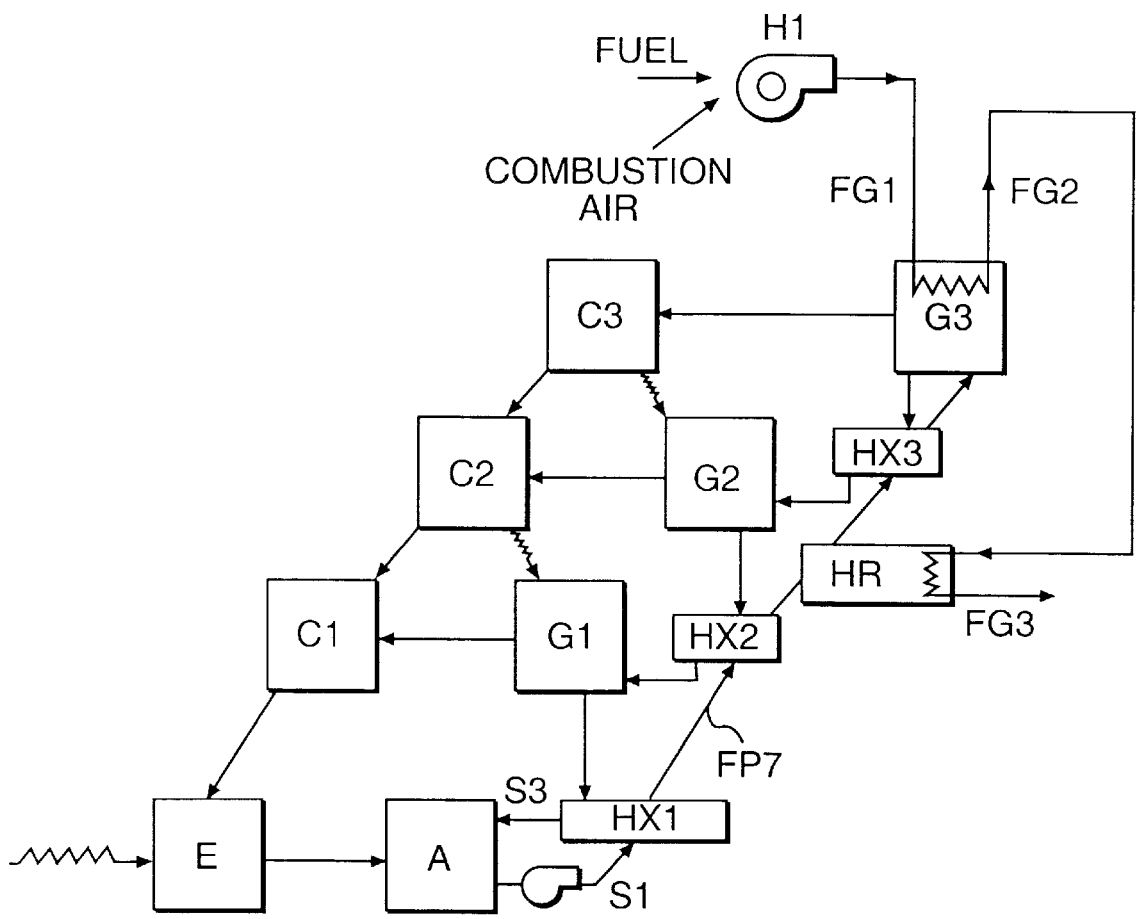
FIG. 10. is a schematic illustrating a fourth embodiment of a triple-effect absorption refrigeration system with a flue gas recuperation system in accordance with the present invention.

A fourth alternative embodiment of the present invention is shown in FIG. 10. In this embodiment, absorber A provides refrigerant-containing absorption solution to the third, second and first generators G3, G2 and G1 via a series flowpath FP7. Input solution S1 is pumped from absorber A to generator G3. Output solution S3 flows from generator G3 to generator G2, from generator G2 to generator G1 and from generator G1, connected in series, to absorber A.

As embodied in FIG. 10, solution-to-solution heat exchangers HX1, HX2 and HX3 are operatively connected to transfer heat from output solution S3 to input solution S1. Heat exchanger HX1 is located between absorber A and generator G1. Heat exchanger HX2 is located between generator G1 and generator G2. Heat exchanger HX3 is located between generator G2 and generator G3.

As further illustrated in FIG. 10, combustion product-to-solution heat exchanger HR is operatively connected to transfer heat from flue gases FG2 to solution S1. Although heat exchanger HR is depicted as being located upstream of heat exchanger HX3 and downstream of heat exchanger HX2 in flowpath FP7, it may be located anywhere along flowpath FP7.

Investigations have been performed to analytically evaluate the improvement in efficiency due to the present invention. If, for example, the flue gas temperatures in a triple effect LiBr absorption refrigeration system can be reduced from 550° F. to 420° F., the combustion efficiency would improve by 4.2% over a triple effect LiBr absorption refrigeration system without flue gas recuperation. This analysis assumed the use of natural gas with 18.0% excess air and 80° F. ambient temperature. Of course, the actual net improvement in the entire triple effect LiBr absorption refrigeration system would be less.

The above description of the embodiments of the invention has been presented for purposes of illustration and description. It is not intended to be exhaustive or to limit the invention to the precise forms disclosed. Modifications and variations are possible in light of the above teachings, or may be acquired from practice of the invention. The embodiments were described in order to explain the principles of the invention, and its practical application was described to enable one skilled in the art to utilize the invention in various embodiments and with various modifications as are suited to the particular use contemplated. The scope of the invention is defined by the attached claims and their equivalents.

We claim:

1. A triple-effect absorption refrigeration system comprising:

an evaporator;

an absorber operatively connected to receive a refrigerant vapor discharged from the evaporator;

first, second, and third generators operatively connected to receive an input absorption solution discharged from the absorber and to discharge an output absorption solution for return to the absorber, the first, second and third generators each discharging a refrigerant vapor;

a heat source for heating the input absorption solution in the third generator to a first temperature, thereby separating the input absorption solution in the third generator into the refrigerant vapor and the output absorption solution, the heat source generating energy laden combustion products;

first, second, and third condensers operatively connected to receive and condense the refrigerant vapor discharged from the first, second and third generators into a refrigerant liquid, respectively, the second and third condensers operatively connected to transfer the refrigerant liquid to the first and second condensers, respectively, the first condenser operatively connected to transfer refrigerant liquid to the evaporator, and the second and third condensers operatively connected to exchange heat with the first and second generators, respectively, thereby separating the input absorption solution in the first and second generators, respectively, into the refrigerant vapor and the output absorption solution; and a combustion products-to-solution heat exchanger operatively connected to transfer heat from the combustion products to the input absorption solution.

2. The refrigeration system of claim 1, wherein the first and second generators are operatively connected in a parallel flowpath with the absorber to receive the absorption solution discharged from the absorber, the third generator is operatively connected in a series flowpath with the second generator to receive the absorption solution discharged from the second generator, and the absorber is operatively connected to the first and third generators to receive the absorption solution discharged from the first and third generators.

3. The refrigeration system of claim 2, wherein the combustion products-to-solution heat exchanger is operatively connected to preheat the absorption solution flowing from the absorber to the first and second generators.

4. The refrigeration system of claim 2, wherein the combustion products-to-solution heat exchanger is operatively connected to preheat the absorption solution flowing from the absorber to the second generator.

5. The refrigeration system of claim 3 or 4, further comprising a first solution-to-solution heat exchanger operatively connected to preheat the absorption solution flowing from the absorber to both the first and second generators with the absorption solution discharged from the first and third generators, a second solution-to-solution heat exchanger operatively connected to preheat the absorption solution flowing from the absorber to the second generator with the absorption solution discharged from the third generator, and a third solution-to-solution heat exchanger operatively connected to preheat the absorption solution flowing from the second generator to the third generator with the absorption solution discharged from the third generator.

6. The refrigeration system of claim 5, further comprising a first pump for pumping the absorption solution from the absorber to the first and second generators and a second pump for pumping the absorption solution from the second generator to the third generator.

7. A triple-effect absorption refrigeration system comprising:

an evaporator;

an absorber operatively connected to receive a refrigerant vapor discharged from the evaporator;

first and second generators operatively connected in a parallel flowpath with the absorber to receive an absorption solution discharged from the absorber, a third generator operatively connected in a series flowpath with the second generator to receive an absorption solution discharged from the second generator, the absorber operatively connected to the first and third generators to receive an absorption solution discharged from the first and third generators, and the first, second and third generators each discharging a refrigerant vapor;

a heat source for heating the absorption solution in the third generator to a first temperature, thereby separating the absorption solution in the third generator into the refrigerant vapor and the absorption solution discharged from the third generator, the heat source generating energy laden combustion products;

first, second, and third condensers operatively connected to receive and condense the refrigerant vapor discharged from the first, second and third generators into a refrigerant liquid, respectively, the second and third condensers operatively connected to transfer the refrigerant liquid to the first and second condensers, respectively, the first condenser operatively connected to transfer refrigerant liquid to the evaporator, and the second and third condensers operatively connected to exchange heat with the first and second generators, respectively, thereby separating the absorption solution in the first and second generators into the refrigerant vapor and the absorption solution discharged from the first and second generators, respectively; and a combustion products-to-solution heat exchanger operatively connected to transfer heat from the combustion products to the absorption solution.

8. The refrigeration system of claim 7, wherein the combustion products-to-solution heat exchanger is operatively connected to preheat the absorption solution flowing from the absorber to the first and second generators.

9. The refrigeration system of claim 7, wherein the combustion products-to-solution heat exchanger is operatively connected to preheat the absorption solution flowing from the absorber to the second generator.

10. The refrigeration system of claim 8 or 9, further comprising a first solution-to-solution heat exchanger operatively connected to preheat the absorption solution flowing from the absorber to both the first and second generators with the absorption solution discharged from the first and third generators, a second solution-to-solution heat exchanger operatively connected to preheat the absorption solution flowing from the absorber to the second generator with the absorption solution discharged from the third generator, and a third solution-to-solution heat exchanger operatively connected to preheat the absorption solution flowing from the second generator to the third generator with the absorption solution discharged from the third generator.

11. The refrigeration system of claim 10, further comprising a first pump for pumping the absorption solution from the absorber to the first and second generators and a second pump for pumping the absorption solution from the second generator to the third generator.

12. A triple-effect absorption refrigeration system comprising:

an evaporator;

an absorber operatively connected to receive a refrigerant vapor discharged from the evaporator;

first, second, and third generators operatively connected in a parallel flowpath to receive an absorption solution discharged from the absorber, the absorber operatively connected to receive an absorption solution discharged from the first, second and third generators, and the first, second and third generators each discharging a refrigerant vapor;

a heat source for heating the absorption solution in the third generator to a first temperature, thereby separating the absorption solution in the third generator into the refrigerant vapor and the absorption solution discharged from the third generator, the heat source generating energy laden combustion products;

first, second, and third condensers operatively connected to receive and condense the refrigerant vapor discharged from the first, second and third generators into a refrigerant liquid, respectively, the second and third condensers operatively connected to transfer the refrigerant liquid to the first and second condensers, respectively, the first condenser operatively connected to transfer refrigerant liquid to the evaporator, and the second and third condensers operatively connected to exchange heat with the first and second generators, respectively, thereby separating the absorption solution in the first and second generators into the refrigerant vapor and the absorption solution discharged from the first and second generators, respectively; and a combustion products-to-solution heat exchanger operatively connected to transfer heat from the combustion products to the absorption solution.

13. The refrigeration system of claim 12, wherein the combustion products-to-solution heat exchanger is operatively connected to preheat the absorption solution discharged from the absorber.

14. The refrigeration system of claim 13, further comprising a first solution-to-solution heat exchanger operatively connected to preheat the absorption solution flowing from the absorber to the first, second and third generators with the absorption solution discharged from the third generator, a second solution-to-solution heat exchanger operatively connected to preheat the absorption solution flowing from the absorber to the second and third generators with the absorption solution discharged from the third generator, and a third solution-to-solution heat exchanger operatively connected to preheat the absorption solution flowing from the absorber to the third generator with the absorption solution discharged from the third generator.

15. The refrigeration system of claim 14, further comprising a pump for pumping the absorption solution from the absorber to the first, second and third generators.

16. A triple-effect absorption refrigeration system comprising:

an evaporator;

an absorber operatively connected to receive a refrigerant vapor discharged from the evaporator;

first, second, and third generators operatively connected in a series flowpath to receive an absorption solution discharged from the absorber, the first generator receiving an absorption solution from the absorber, the second generator receiving an absorption solution from the first generator and the third generator receiving an absorption solution from the second generator, the absorber operatively connected to the third generator to receive an absorption solution discharged from the third generator, and the first, second and third generators each discharging a refrigerant vapor;

a heat source for heating the absorption solution in the third generator to a first temperature, thereby separating the absorption solution in the third generator into the refrigerant vapor and the absorption solution discharged from the third generator, the heat source generating energy laden combustion products;

first, second, and third condensers operatively connected to receive and condense the refrigerant vapor discharged from the first, second and third generators into a refrigerant liquid, respectively, the second and third condensers operatively connected to transfer the refrigerant liquid to the first and second condensers, respectively, the first condenser operatively connected to transfer refrigerant liquid to the evaporator, and the second and third condensers operatively connected to exchange heat with the first and second generators, respectively, thereby separating the absorption solution in the first and second generators into the refrigerant vapor and the absorption solution discharged from the first and second generators, respectively; and a combustion products-to-solution heat exchanger operatively connected to transfer heat from the combustion products to the absorption solution.

17. The refrigeration system of claim 16, wherein the combustion products-to-solution heat exchanger is operatively connected to preheat the absorption solution discharged from the absorber.

18. The refrigeration system of claim 16, wherein the combustion products-to-solution heat exchanger is operatively connected to preheat the absorption solution discharged from the first generator.

19. The refrigeration system of claim 16, wherein the combustion products-to-solution heat exchanger is operatively connected to preheat the absorption solution discharged from the second generator.

20. The refrigeration system of claim 17, 18 or 19, further comprising a first solution-to-solution heat exchanger operatively connected to preheat the absorption solution flowing from the absorber to the first generator with the absorption solution discharged from the third generator, a second solution-to-solution heat exchanger operatively connected to preheat the absorption solution flowing from the first generator to the second generator with the absorption solution discharged from the third generator, and a third solution-to-solution heat exchanger operatively connected to preheat the absorption solution flowing from the second generator to the third generator with the absorption solution discharged from the third generator.

21. The refrigeration system of claim 20, further comprising a first pump for pumping the absorption solution from the absorber to the first generator, a second pump for pumping the absorption solution from the first generator to the second generator and a third pump for pumping the absorption solution from the second generator to the third generator.

22. A triple-effect absorption refrigeration system comprising:

an evaporator;

an absorber operatively connected to receive a refrigerant vapor discharged from the evaporator;

first, second, and third generators operatively connected in a series flowpath to receive an absorption solution discharged from the absorber, the third generator receiving an absorption solution from the absorber, the second generator receiving an absorption solution from the third generator and the first generator receiving an absorption solution from the second generator, the absorber operatively connected to the first generator to receive an absorption solution discharged from the first generator, and the first, second and third generators each discharging a refrigerant vapor;

a heat source for heating the absorption solution in the third generator to a first temperature, thereby separating the absorption solution in the third generator into the refrigerant vapor and the absorption solution discharged from the third generator, the heat source generating energy laden combustion products;

first, second, and third condensers operatively connected to receive and condense the refrigerant vapor discharged from the first, second and third generators into a refrigerant liquid, respectively, the second and third condensers operatively connected to transfer the refrigerant liquid to the first and second condensers, respectively, the first condenser operatively connected to transfer refrigerant liquid to the evaporator, and the second and third condensers operatively connected to exchange heat with the first and second generators, respectively, thereby separating the absorption solution in the first and second generators into the refrigerant vapor and the absorption solution discharged from the first and second generators, respectively; and a combustion products-to-solution heat exchanger operatively connected to transfer heat from the combustion products to the absorption solution.

23. The refrigeration system of claim 22, wherein the combustion products-to-solution heat exchanger is operatively connected to preheat the absorption solution flowing to the first generator.

24. The refrigeration system of claim 22, wherein the combustion products-to-solution heat exchanger is operatively connected to preheat the absorption solution flowing to the second generator.

25. The refrigeration system of claim 22, wherein the combustion products-to-solution heat exchanger is operatively connected to preheat the absorption solution flowing to the third generator.

26. The refrigeration system of claim 23, 24 or 25, further comprising a first solution-to-solution heat exchanger operatively connected to preheat the absorption solution flowing from the absorber to the third generator with the absorption solution discharged from the first generator, a second solution-to-solution heat exchanger operatively connected to preheat the absorption solution flowing from the absorber to the third generator with the absorption solution discharged from the second generator and a third solution-to-solution heat exchanger operatively connected to preheat the absorption solution flowing from the absorber to the third generator with the absorption solution discharged from the third generator.

27. The refrigeration system of claim 26, further comprising a pump for pumping the absorption solution from the absorber to the third generator.

* * * * *